(12) United States Patent
Katayama (10) Patent No.: US 7,242,647 B2
(45) Date of Patent: Jul. 10, 2007

(54) OPTICAL HEAD UNIT AND OPTICAL INFORMATION WRITING/READING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 10/701,015

(22) Filed: Nov. 5, 2003

(65) Prior Publication Data

US 2004/0090901 A1 May 13, 2004

(30) Foreign Application Priority Data

Nov. 6, 2002 (JP) .............................. 2002-323012

(51) Int. Cl.
G11B 7/00 (2006.01)
(52) U.S. Cl. .............................. 369/44.37; 369/112.24
(58) Field of Classification Search ............. 369/44.37, 369/112.24
See application file for complete search history.

(56) References Cited

U.S. PATENT DOCUMENTS

| | | | |
|---|---|---|---|
| 6,545,958 B1 * | 4/2003 | Hirai et al. | 369/44.32 |
| 6,621,771 B1 * | 9/2003 | Furuta et al. | 369/44.16 |
| 6,650,612 B1 * | 11/2003 | Matsuzaki et al. | 369/112.05 |
| 6,674,059 B1 * | 1/2004 | Nakano | 250/201.5 |
| 6,781,943 B2 * | 8/2004 | Saito | 369/112.08 |

FOREIGN PATENT DOCUMENTS

JP 2000-242943 A 9/2000

OTHER PUBLICATIONS

M. Itonaga et al., "NA=0.85 Single Objective Lens for a High Density Optical Disk System", We-C-03, Technical Digest, (Oct. 16-19, 2001).
K. Yamamoto et al., "0.8-Numerical-Aperture Two-Element Objective Lens for the Optical Disk", Jpn. J. Appl. Phys. vol. 36, Part 1, No. 1B, (Jan. 1997), pp. 456-459.
M. Itonaga et al., "NA=0.85 Single Objective Lens for a High Density Optical Disk System", We-C-03, Technical Digest, (Oct. 16-19, 2001).
K. Maruyama et al., "Background of Conception of DVD/CD Compatible Diffractive Lens", TAO2, Nov. 15-17, 2000, pp. 93-96.
R. Katayama et. al., "Land/Groove Signal and Differential Push-Pull Signal Detection for Optical Disks by an Improved 3-Beam Method", Jpn. J. Appl. Phys., vol. 38, Part 1, No. 3B, (Mar. 1999), pp. 1761-1767.

* cited by examiner

Primary Examiner—Gautam R. Patel
(74) Attorney, Agent, or Firm—Sughrue Mion, PLLC (57) ABSTRACT

An optical head unit is provided including a first light source emitting a light with a first wavelength, a second light source emitting a light with a second wavelength, and a third light source emitting a light with a third wavelength. The optical head unit also includes a first objective lens irradiating the light emitted from the first light source onto an optical recording medium, a second objective lens irradiating the light emitted from the second light source or the light emitted from the third light source onto an optical recording medium, and a photodetector receiving a reflected light from the optical recording medium.

16 Claims, 10 Drawing Sheets

OPTICAL HEAD UNIT AND OPTICAL INFORMATION WRITING/READING DEVICE

BACKGROUND OF THE INVENTION

1. Field of the Invention

The present invention relates to an optical head unit and optical information writing/reading device, and more particularly, to an optical head unit and an optical information writing/reading device having a plurality of objective lenses.

2. Description of the Related Art

A recording density of an optical information writing/reading device is inversely proportional to a square of the diameter of a focal spot formed on an optical recording medium by an optical head unit. In other words, the smaller the diameter of the focal spot, the higher the recording density. The diameter of the focal spot is proportional to a wavelength of a light source and is inversely proportional to a numerical aperture of an objective lens. In other words, the shorter the wavelength of the light source and the higher the numerical aperture of the objective lens, the smaller the diameter of the focal spot. On the other hand, when an optical recording medium (optical disc) is tilted to an objective lens, the shape of a focal spot is fluctuated due to coma aberration, resulting in deterioration of the writing/reading characteristic. The coma aberration is inversely proportional to the wavelength of a light source and is proportional to the cube of the numerical aperture of the objective lens and the thickness of a protective layer of an optical recording medium. When the thicknesses of protective layers of optical recording media are the same, the shorter the wavelength of the light source and the higher the numerical aperture of the objective lens, the margin of the tilt of the optical recording medium with respect to the writing/reading characteristic is narrower.

In an optical information writing/reading device which shortens the wavelength of a light source and increases the numerical aperture of an objective lens to increase the recording density, the thickness of a protective layer of an optical recording medium is smaller to secure the margin of the tilt of the optical recording medium with respect to the write/read characteristic. For example, in a standard CD (compact disc) having a capacity of 650 MB, the wavelength of a light source is 780 nm, the numerical aperture of an objective lens is 0.45, and the thickness of a protective layer of an optical disc is 1.2 mm. In a standard DVD (digital versatile disc) having a capacity of 4.7 GB, the wavelength of a light source is 650 nm, the numerical aperture of an objective lens is 0.6, and the thickness of a protective layer of an optical disc is 0.6 mm.

In a typical optical head, an objective lens is designed to cancel a spherical aberration to an optical disc having a protective layer having a certain thickness. When writing and reading are performed onto/from optical discs having protective layers having different thicknesses, the spherical aberration remains and correct writing and reading cannot be performed. Accordingly, there is proposed an optical head unit having a compatible function which can perform writing and reading onto/from both of an optical disc of the DVD standard and an optical disc of the CD standard. Such kind of optical head units are classified into one using a single objective lens and one using a plurality of objective lenses. The optical head unit using a plurality of objective lenses has a construction slightly more complicated than that of the optical head unit using a single objective lens. However, the respective objective lenses can be optimally designed for the optical discs of the respective standards, so that the writing/reading performance to the optical discs of the respective standards is excellent.

Figure 1:
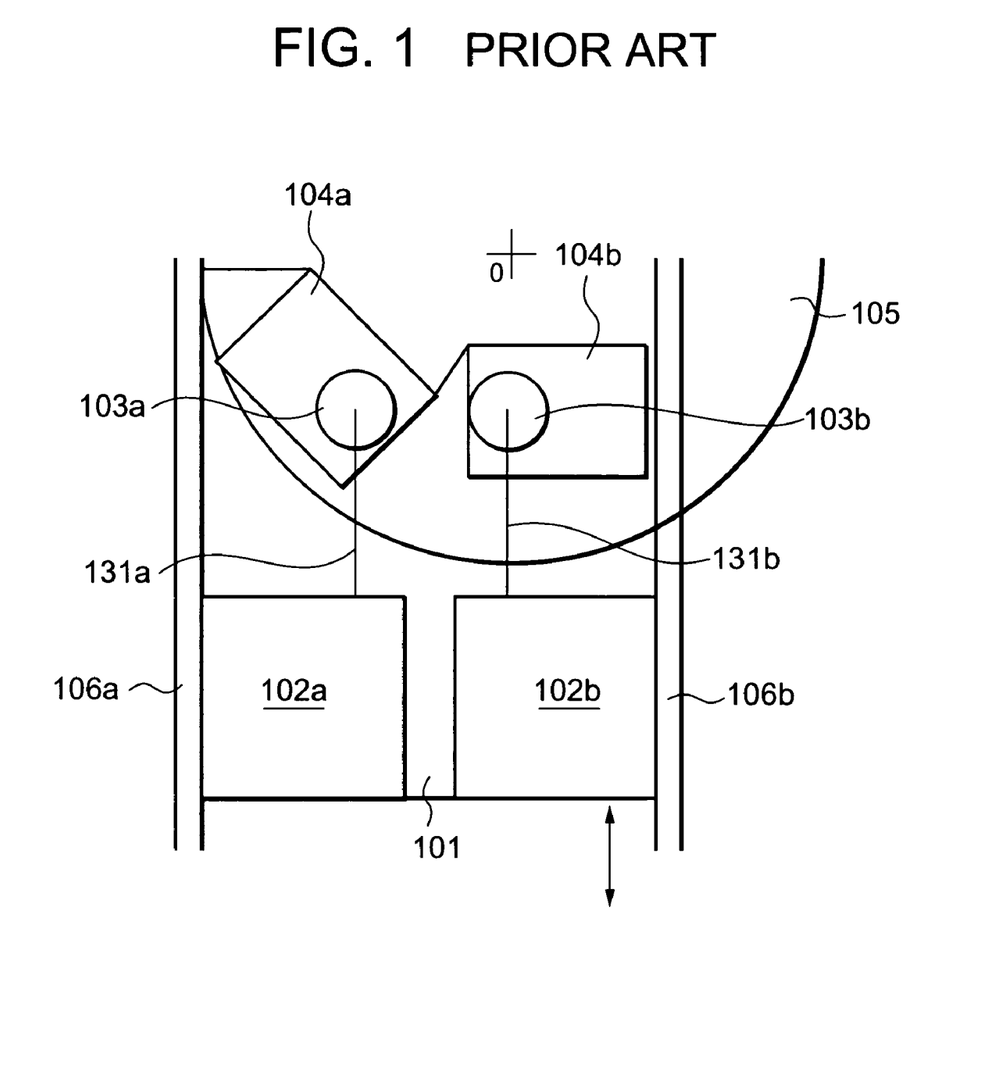
FIG. 1 is a plan view showing the schematic construction of a prior art optical head unit.

As an example of a prior art optical head unit using a plurality of objective lenses, which can perform writing and reading onto/from both of an optical disc of the DVD standard and an optical disc of the CD standard, Japanese Published Application 2000-242943 discloses an optical head unit shown in FIG. 1.

As shown in FIG. 1, an optical head unit 101 in the prior art has a first optical system 102a, a second optical system 102b, a first objective lens 103a mounted on a first actuator 104a, and a second objective lens 103b mounted on a second actuator 104b.

The first optical system 102a and the second optical system 102b have a semiconductor laser, not shown, as a light source. A photodetector, not shown, receives a light from an optical disc 105 of the DVD standard or the CD standard. The wavelength of an emitted light of the semiconductor laser in the first optical system 102a is 650 nm, and the wavelength of an emitted light of the semiconductor laser in the second optical system 102b is 780 nm.

The emitted light from the semiconductor laser in the first optical system 102a is incident upon the first objective lens 103a and is focused onto the optical disc 105 of the DVD standard having a protective layer having a thickness of 0.6 mm. A reflected light from the optical disc 105 passes through the first objective lens 103a in the reverse direction to be received by the photodetector in the first optical system 102a. In addition, the emitted light from the semiconductor laser in the second optical system 102b is incident upon the second objective lens 103b and is focused onto the optical disc 105 of the CD standard having a protective layer having a thickness of 1.2 mm. A reflected light from the optical disc 105 passes through the second objective lens 103b in the reverse direction to be received by the photodetector in the second optical system 102b.

The first objective lens 103a has a spherical aberration canceling a spherical aberration caused when the light with a wavelength of 650 nm passes through the protective layer having a thickness of 0.6 mm of the optical disc 105. The second objective lens 103b has a spherical aberration canceling a spherical aberration caused when the light with a wavelength of 780 nm passes through the protective layer having a thickness of 1.2 mm of the optical disc 105.

The optical head unit 101 is moved between the innermost circumference and the outermost circumference of the optical disc 105 in the direction of the arrows of FIG. 1 along two rails 106a and 106b arranged in parallel with each other.

In FIG. 1, the numeral 131a denotes a first optical path connecting the first optical system 102a and the first objective lens 103a, and the numeral 131b denotes a second optical path connecting the second optical system 102b and the second objective lens 103b.

In recent years, to increase the recording density, there has been proposed a next-generation standard in which the wavelength of a light source is shorter, the numerical aperture of an objective lens is higher, and the thickness of a protective layer of an optical recording medium (optical disc) is smaller. For example, with the name of Blu-ray Disc (BD), there has been proposed a next-generation standard having a capacity of 23.3 GB in which the wavelength of a light source is 405 nm, the numerical aperture of an objective lens is 0.85, and the thickness of a protective layer (cover layer) of an optical disc is 0.1 mm. Accordingly, what is desired is an optical head unit having a compatible function which can perform writing and reading onto/from any of an optical disc of such next-generation standard and conventional optical discs of the DVD standard and the CD standard. However, there has not yet been an optical head unit using a plurality of objective lenses which can perform writing and reading onto/from any of the optical disc of the next-generation standard and the conventional optical discs of the DVD standard and the CD standard.

SUMMARY OF THE INVENTION

To overcome the problems in the prior art described above, and to overcome other problems that will become apparent to one of ordinary skill in the art upon reading and understanding the present specification, the present invention discloses an optical head unit and optical information writing/reading device.

The present invention provides an optical head unit having a plurality of objective lenses and an optical information writing/reading device, which can write and read information onto/from optical discs of any standard.

According to a first aspect of the present invention, an optical head unit comprises a first light source emitting a light with a first wavelength, a second light source emitting a light with a second wavelength, a third light source emitting a light with a third wavelength, a first objective lens irradiating the light emitted from the first light source onto an optical recording medium, a second objective lens irradiating the light emitted from the second light source or the light emitted from the third light source onto an optical recording medium, and a photodetector receiving a reflected light from the optical recording medium.

DETAILED DESCRIPTION OF THE INVENTION

Figure 2:
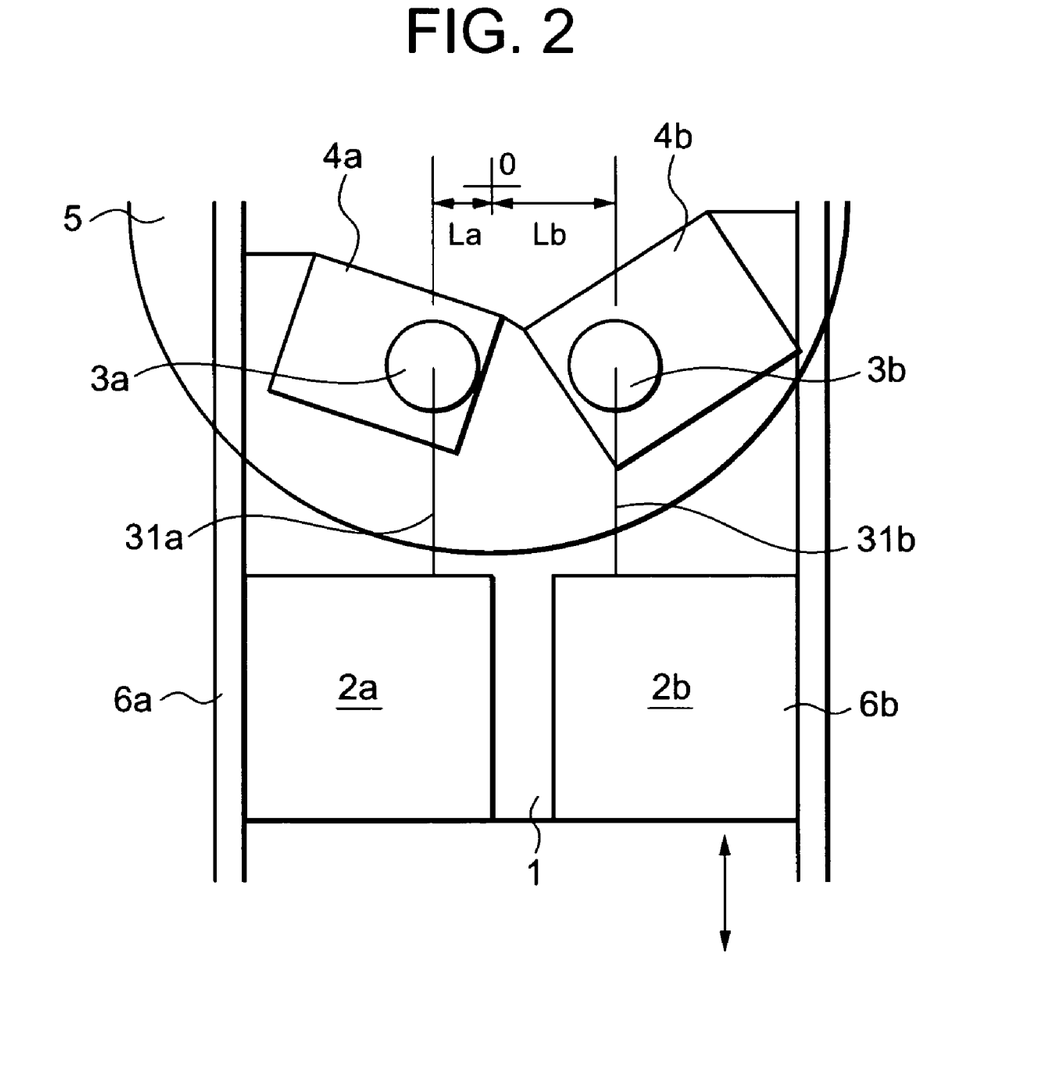
FIG. 2 is a plan view showing the schematic construction of an optical head unit of a first embodiment of the present invention.

A schematic construction of an optical head unit 1 of a first embodiment of the present invention is shown in FIG. 2. As shown in FIG. 2, the optical head unit 1 has a first optical system 2a, a second optical system 2b, a first actuator 4a, a second actuator 4b, a first objective lens 3a mounted on the first actuator 4a, and a second objective lens 3b mounted on the second actuator 4b. The first optical system 2a and the second optical system 2b each have a semiconductor laser as a light source, and a photodetector receiving a reflected light from an optical disc 5 of the next-generation standard, the DVD standard or the CD standard. An illustrative wavelength of an emitted light of the semiconductor laser in the first optical system 2a is 405 nm. An illustrative wavelength of an emitted light of the semiconductor laser in the second optical system 2b is 650 nm or 780 nm. As indicated by the arrows in FIG. 2, the optical head unit 1 is moved between the innermost circumference and the outermost circumference of the optical disc 5 along two rails 6a and 6b arranged in parallel with each other.

The emitted light (wavelength of 405 nm) from the semiconductor laser in the first optical system 2a is incident via a first optical path 31a upon the first objective lens 3a to be focused onto the optical disc 5. A reflected light from the optical disc 5 passes through the first objective lens 3a in the reverse direction to be received by the photodetector in the first optical system 2a.

The emitted light (wavelength of 650 nm) from one of the semiconductor lasers in the second optical system 2b is incident via a second optical path 31b upon the second objective lens 3b to be focused onto the optical disc 5. A reflected light from the optical disc 5 passes through the second objective lens 3b in the reverse direction to be received by the photodetector in the second optical system 2b. The emitted light (wavelength of 780 nm) from the other of the semiconductor lasers in the second optical system 2b is incident via the second optical path 31b upon the second objective lens 3b to be focused onto the optical disc 5. A reflected light from the optical disc 5 passes through the second objective lens 3b in the reverse direction to be received by the photodetector in the second optical system 2b.

The first objective lens 3a has a spherical aberration canceling a spherical aberration caused when the light with a wavelength of 405 nm passes through a protective layer having a thickness of 0.1 mm and is optimized for the optical recording medium of the next-generation standard. To this, the second objective lens 3b has a spherical aberration substantially canceling a spherical aberration caused when the light with a wavelength of 650 nm passes through a protective layer having a thickness of 0.6 mm and has a spherical aberration substantially canceling a spherical aberration caused when the light with a wavelength of 780 nm passes through a protective layer having a thickness of 1.2 mm. In other words, the spherical aberration of the second objective lens 3b is set to substantially cancel a spherical aberration caused when the light with a wavelength of 650 nm passes through the protective layer having a thickness of 0.6 mm and to substantially cancel a spherical aberration caused when the light with a wavelength of 780 nm passes through the protective layer having a thickness of 1.2 mm.

In this way, the second objective lens 3b is not optimized for only the optical disc of the DVD standard or only the optical disc of the CD standard. However, its remaining spherical aberration is within the allowable range for any of the DVD standard and the CD standard. Thus, the second objective lens 3b can correctly write and read information onto/from the optical disc of any of the DVD standard and the CD standard.

Figure 3:
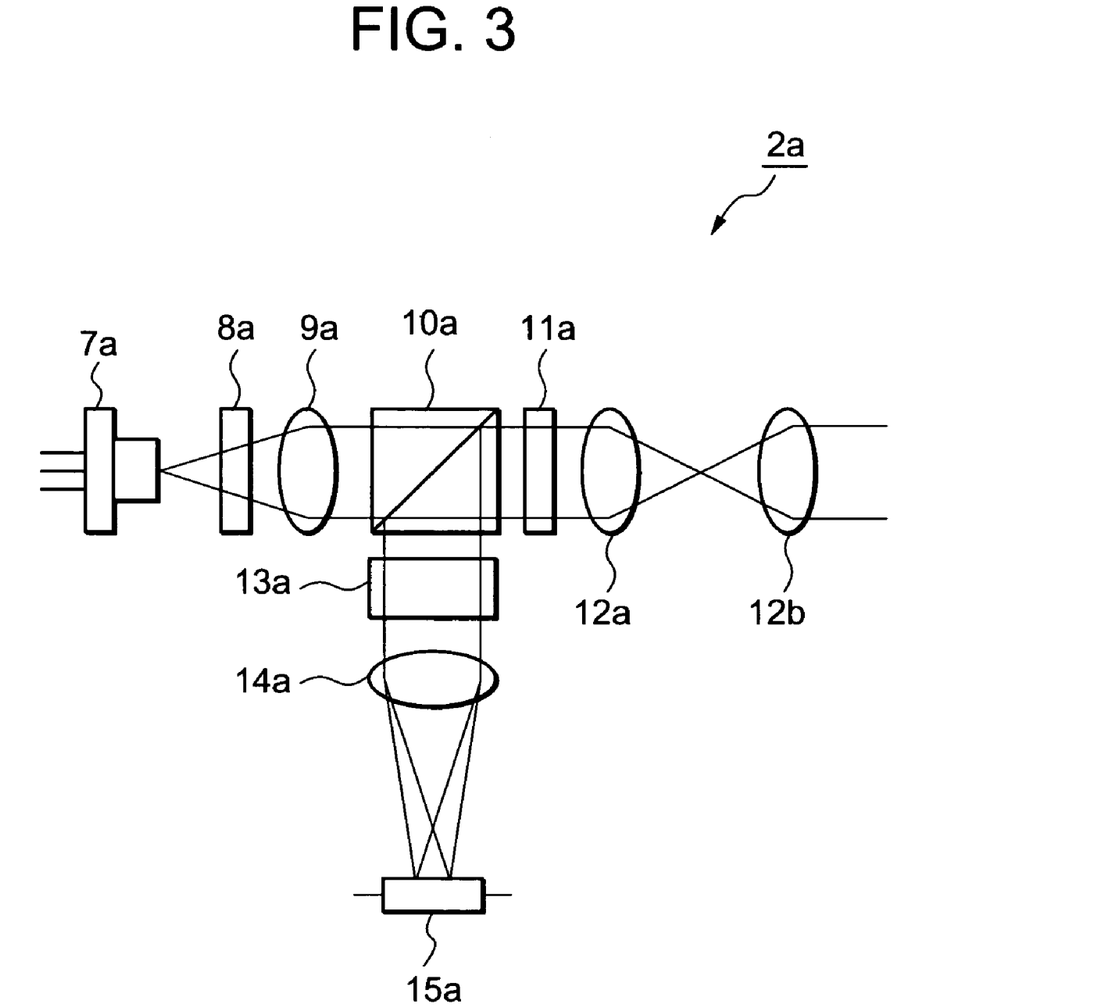
FIG. 3 is a view showing the construction of a first optical system used in the optical head unit of FIG. 2.

The construction of the first optical system 2a is shown in FIG. 3. The emitted light with a wavelength of 405 nm from a semiconductor laser 7a is divided into three lights of a zero order light and ± first order diffraction lights by a diffraction optical device 8a. These three lights are collimated by a collimator lens 9a to be incident as P polarized light upon a polarization beam splitter 10a. Almost of these lights pass through the polarization beam splitter 10a. Thereafter, they pass through a ¼ wave plate 11a to be converted from a linearly polarized light to a circularly polarized light, and further pass through a relay lens 12a and a relay lens 12b to be irradiated upon the optical disc 5 by the first objective lens 3a.

The reflected lights (wavelength of 405 nm) from the optical disc 5 pass through the first objective lens 3a in the reverse direction, and then pass through the relay lens 12b and the relay lens 12a in the reverse direction. Further, they pass through the ¼ wave plate 11a to be converted from a circularly polarized light to a linearly polarized light which the polarization direction is orthogonal to that in the going path. They are then incident as S polarized light upon the polarization beam splitter 10a for reflection of almost of them, and pass through a cylindrical lens 13a and a lens 14a to be received by a photodetector 15a.

The photodetector 15a of the first optical system 2a is arranged in about the middle of two focal lines of the cylindrical lens 13a and the lens 14a.

Generally, when the thickness of a protective layer of an optical disc is deviated from the design value, a spherical aberration caused by the thickness deviation of the protective layer fluctuates the shape of the focal spot on the optical disc, resulting in deterioration of the writing/reading characteristic. The spherical aberration is inversely proportional to the wavelength of a light source and is proportional to the biquadrate of the numerical aperture (NA) of an objective lens. The shorter the wavelength of the light source and the higher the numerical aperture of the objective lens, the margin of the thickness deviation of the protective layer of the optical disc with respect to the writing/reading characteristic is narrower. For example, when the wavelength of the semiconductor laser 7a as the light source is 405 nm and the numerical aperture of the objective lens 3a is 0.85, the margin of the thickness deviation of the protective layer is insufficient. The thickness deviation of the protective layer of the optical disc 5 may be corrected. When any one of the relay lens 12a and the relay lens 12b is moved in its optical axis direction by the actuator, not shown, the magnification of the first objective lens 3a is changed to vary the spherical aberration. The position of the optical axis direction of any one of the relay lenses 12a and 12b is adjusted to cause a spherical aberration canceling a spherical aberration caused by the thickness deviation of the protective layer of the optical disc 5 by the first objective lens 3a. The thickness deviation of the protective layer of the optical disc 5 can be corrected to eliminate adverse affection on the writing/reading characteristic.

Figure 4:
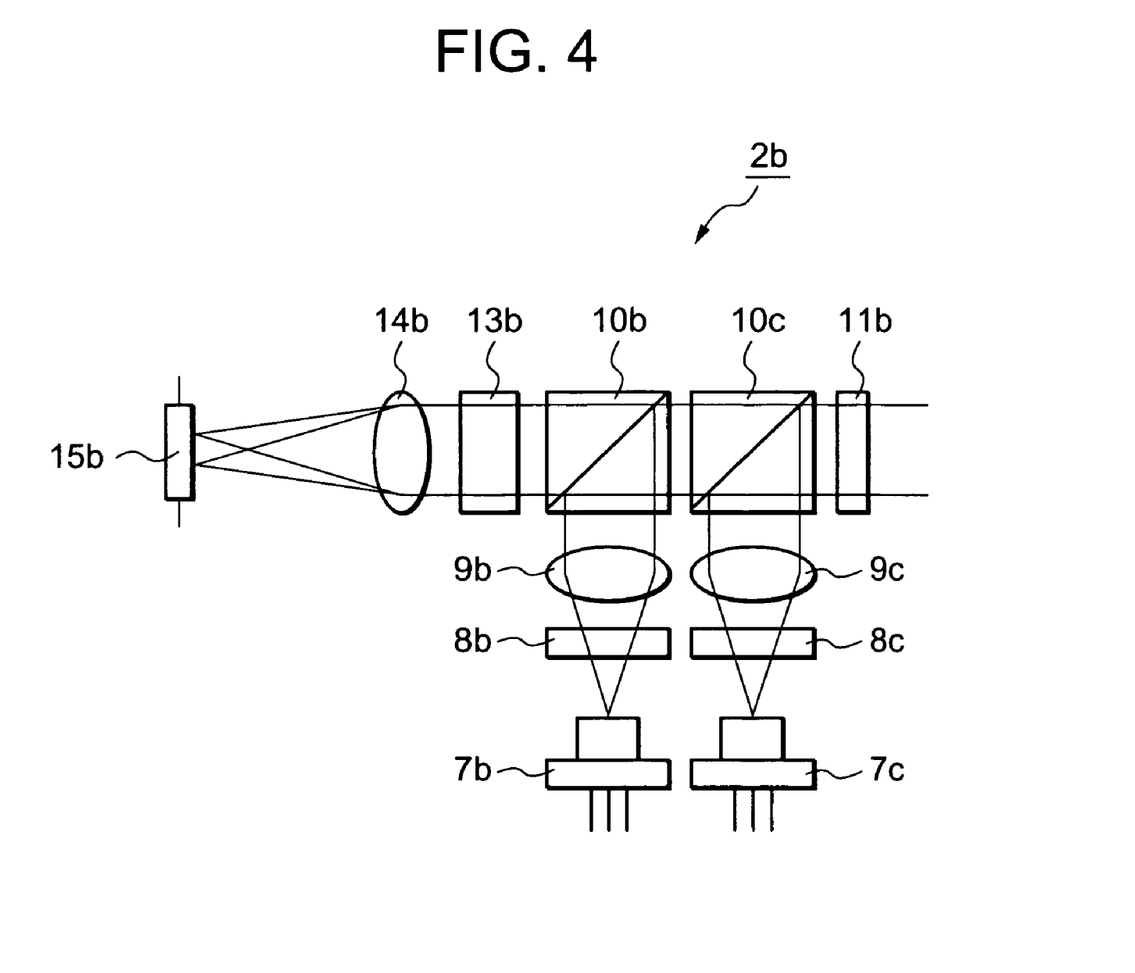
FIG. 4 is a view showing the construction of a second optical system used in the optical head unit of FIG. 2.

The construction of the second optical system 2b is shown in FIG. 4. The emitted light with a wavelength of 650 nm from a semiconductor laser 7b is divided into three lights of a zero order light and ± first order diffraction lights by a diffraction optical device 8b. These three lights are collimated by a collimator lens 9b to be incident as the S polarized light upon a polarization beam splitter 10b. Almost all of these lights are reflected by the polarization beam splitter 10b, and almost all of them pass through a polarization beam splitter 10c. Thereafter, they pass through a ¼ wave plate 11b to be converted from a linearly polarized light to a circularly polarized light and are irradiated onto the optical disc 5 by the second objective lens 3b.

The reflected lights (wavelength of 650 nm) from the optical disc 5 pass through the second objective lens 3b in the reverse direction, and then pass through the ¼ wave plate 11b to be converted from a circularly polarized light to a linearly polarized light which the polarization direction is orthogonal to that in the going path. Almost all of the reflected lights pass through the polarization beam splitter 10c to be incident as the P polarized light upon the polarization beam splitter 10b. Almost all of them pass therethrough, thereby passing through a cylindrical lens 13b and a lens 14b to be received by a photodetector 15b.

In addition, the emitted light with a wavelength of 780 nm from a semiconductor laser 7c is divided into three lights of a zero order light and ± first order diffraction lights by a diffraction optical device 8c. These three lights are collimated by a collimator lens 9c to be incident as the S polarized light upon a polarization beam splitter 10c. Almost all of these lights are reflected by the polarization beam splitter 10c. They pass through the ¼ wave plate 11b to be converted from a linearly polarized light to a circular polarized light and are irradiated onto the optical disc 5 by the second objective lens 3b.

The reflected lights (wavelength of 780 nm) from the optical disc 5 pass through the second objective lens 3b in the reverse direction, and then pass through the ¼ wave plate 11b to be converted from a circular polarized light to a linearly polarized light which the polarization direction is orthogonal to that in the going path. The reflected lights are incident as the P polarized light upon the polarization beam splitter 10c so that almost all of them pass therethrough. Almost all of them pass through the polarization beam splitter 10b, thereby passing through the cylindrical lens 13b and the lens 14b to be received by the photodetector 15b.

The photodetector 15b of the second optical system 2b is arranged in about the middle of two focal lines of the cylindrical lens 13b and the lens 14b.

Figure 5A:
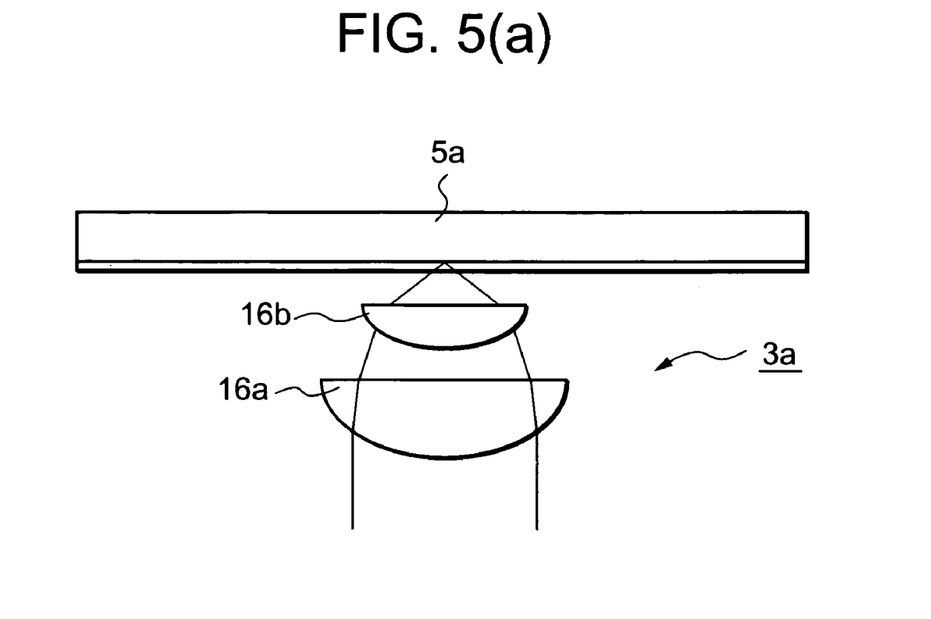
FIG. 5(a) is a view showing the construction of an objective lens used in the first optical system of the optical head unit of FIG. 2.
Figure 5B:
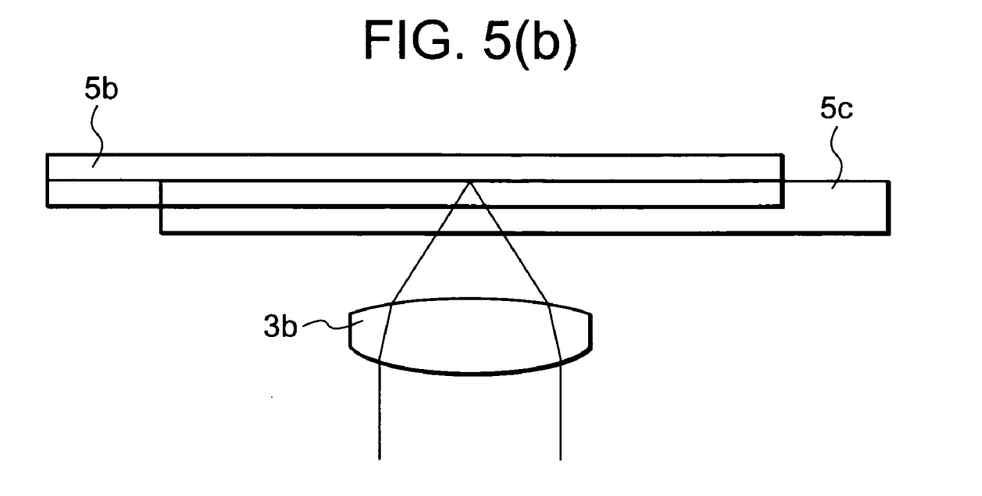
FIG. 5(b) is a view showing the construction of an objective lens used in the second optical system of the optical head unit of FIG. 2.

FIGS. 5(a) and 5(b) show illustrative examples of the first objective lens 3a and the second objective lens 3b, respectively. The first objective lens 3a has a numerical aperture of 0.85. As shown in, FIG. 5(a), the first objective lens 3a has two lenses in two groups of a first lens 16a and a second lens 16b. As a specific example of such objective lens having two lenses in two groups, for example, there is one described in Japanese Journal of Applied Physics, Vol. 36, pp. 456–459.

The first objective lens 3a can also be constructed by a single lens. As a specific example of an objective lens having a single lens, there is one described in International Symposium on Optical Memory-2001, Technical Digest, pp. 26–27.

The light with a wavelength of 405 nm incident upon the first objective lens 3a is focused onto the optical disc 5a of the next-generation standard having the protective layer having an illustrative thickness of 0.1 mm to form an optimum light spot.

In the second objective lens 3b, the numerical aperture to the light with the wavelength of 650 nm is 0.6, and the numerical aperture to the light with a wavelength of 780 nm is 0.45. It may be constructed by a diffraction-refraction combined lens formed with a diffraction grating on a first surface. As a specific example of such objective lens having a diffraction-refraction combined lens, there is one described in Optical Design and Fabrication 2000, Proceedings, pp. 93–96.

The light with a wavelength of 650 nm incident upon the second objective lens 3b is focused onto the optical disc 5b of the DVD standard having the protective layer having a thickness of 0.6 mm to form a light spot. The light with a wavelength of 780 nm incident upon the second objective lens 3b is focused onto the optical disc 5c of the CD standard having the protective layer having a thickness of 1.2 mm to form a preferable light spot.

The first objective lens 3a is optimally designed to the optical disc of the next-generation standard and can obtain writing/reading performance sufficient for the optical disc of the next-generation standard having a narrow writing/reading margin. On the other hand, the second objective lens 3b is not optimally designed for only the optical disc of the DVD standard or the optical disc of the CD standard but is designed for both. The optical disc of the DVD standard and the optical disc of the CD standard have a relatively wide writing/reading margin.

Figure 6A:
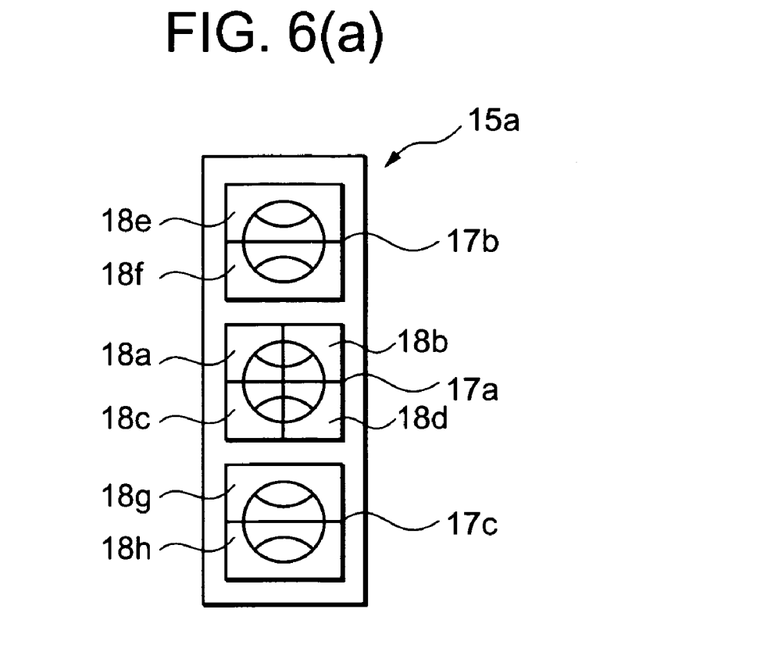
FIGS. 6(a) and (b) are views showing the constructions of photodetectors used in the optical head unit of FIG. 2 and light spots.

The construction of the photodetector 15a of the first optical system 2a is shown in FIG. 6(a). The photodetector 15a has, for the zero order light, light reception parts 18a, 18b, 18c and 18d divided into four by a division line in parallel with the radius direction of the optical disc 5 and a division line in parallel with the tangent direction of the optical disc 5, and for the +1 order diffraction light, light reception parts 18e and 18f divided into two by a division line in parallel with the radius direction of the optical disc 5, and for the −1 order diffraction light, light reception parts 18g and 18h divided into two by a division line in parallel with the radius direction of the optical disc 5. The radius direction is a direction along which the optical head unit moves from an innermost portion of the optical disc to an outermost portion of the optical disc. The tangent direction is perpendicular to the radius direction. In addition, the light reception parts are in order of the tangent direction. In FIG. 2, the parallel direction with the rail is the radius direction.

The zero order light of three reflected lights from the optical disc 5 forms a light spot 17a on the four light reception parts 18a, 18b, 18c and 18d. The +1 order diffraction light of the reflected lights forms a light spot 17b on the two light reception parts 18e and 18f. The −1 order diffraction light of the reflected lights forms a light spot 17c on the two light reception parts 18g and 18h.

Electric signal outputs obtained from the eight light reception parts 18a to 18h of the photodetector 15a are expressed as V18a to V18h, respectively. A focus error signal is obtained from operation of (V18a+V18d)−(V18b+V18c) by a known "astigmatism method". A track error signal is obtained from operation of (V18a+V18b)−(V18c+V18d)−K [(V18e+V18g)−(V18f+V18h) (K is a constant.) by a known "difference push-pull method". An RF signal (data signal) from the optical disc 5 is obtained from operation of (V18a+V18b+V18c+V18d).

The construction of the photodetector 15b of the second optical system 2b is the same as shown in FIG. 6(a).

In addition, in this embodiment, when the optical head unit 1 is moved between the innermost circumference and the outermost circumference of the optical disc 5, distance La between a straight line including a track of the center of the first objective lens 3a and the center O of the optical disc 5 may be shorter than distance Lb between the straight line including the track of the center of the second objective lens 3b and the center O of the optical disc 5 as shown in FIG. 2. In other words, La<Lb may be set.

When the optical head unit 1 is moved between the innermost circumference and the outermost circumference of the optical disc 5 and the straight line including the track of the center of the objective lens 3a or 3b does not pass through center O of the optical disc 5, the angle between the tracks of the optical disc 5 and the division lines of the photodetectors 15a, 15b (division lines in parallel with the tangent direction of the optical disc 5) is changed according to the radius of the optical disc 5 where the center of the objective lens 3a or 3b is positioned. When the angle is deviated from 0°, offset occurs in the focus error signal of the "astigmatism method" and the modulation factor of the track error signal of the "push-pull method" is lowered.

Figure 7:
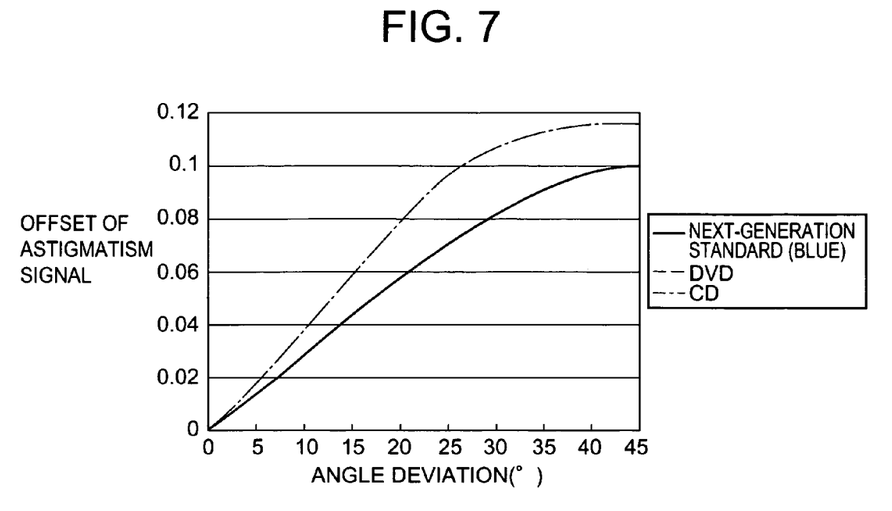
FIG. 7 is a diagram showing the relation between the angle deviation between the tracks of an optical disc and the division lines of the photodetectors and the offsets (calculated values) of focus error signals (astigmatism signals) with it in the optical head unit of FIG. 2.

FIG. 7 shows results calculated by standardizing, by sum signals, the offsets of the focus error signals of the "astigmatism method" with angle deviation between the tracks of the optical disc 5 and the division lines of the photodetectors 15a, 15b (division lines in parallel with the tangent direction of the optical disc 5) in the optical discs 5 of the next-generation standard using a blue light, the DVD standard, and the CD standard. In addition, FIG. 8 shows results calculated by standardizing, by sum signals, the modulation factors of the track error signals of the "push-pull method" with the angle deviation in the optical discs 5 of these three standards.

Figure 8:
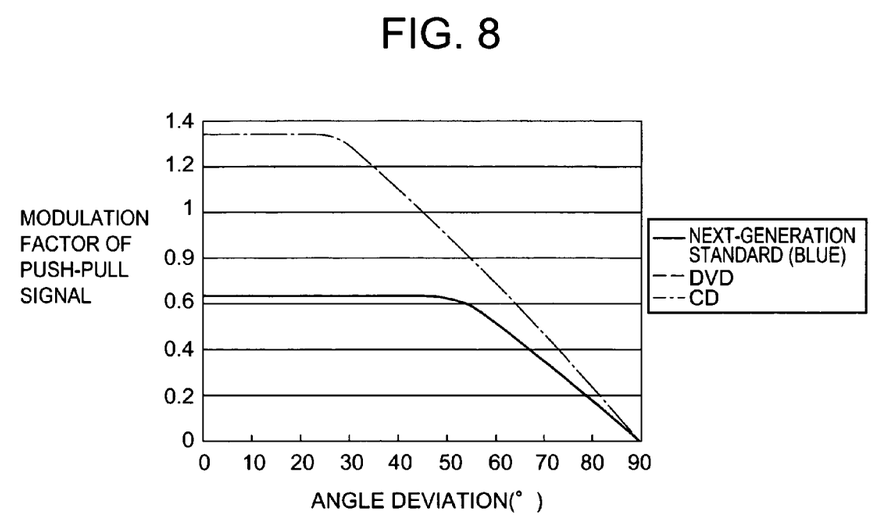
FIG. 8 is a diagram showing the relation between the angle deviation between the tracks of an optical disc and the division lines of the photodetectors and the modulation factors (calculated values) of track error signals (push-pull signals) with it in the optical head unit of FIG. 2.

In FIG. 7 and FIG. 8, a, curved line of the next-generation standard (blue) mostly corresponds with a curved line of the DVD standard.

As shown in FIG. 8, the modulation factor of the track error signal is not lowered to about 20° of angle deviation. As shown in FIG. 7, the offsets of the focus error signals are increased in proportion to increase of angle deviation. Comparing a slope of the curved line of the next-generation standard, the DVD standard, with the CD standard in a scope of 0° to 25° of angle deviation, the offsets of the focus error signals in the next-generation standard (blue) and the DVD standard are about ¾ of the offset of the focus error signal in the CD standard. However, the allowable value of the offset of the focus error signal is generally proportional to the wavelength of the light source and is inversely proportional to the square of the numerical aperture of the objective lens. The allowable values of the offsets of the focus error signals in the next-generation standard and the DVD standard are, for example, about 15% and about 47% of the allowable value of the offset of the focus error signal in the CD standard, respectively. Accordingly, the percentage of the offset of the focus error signal caused with the angle deviation to its allowable value is the largest in the next-generation standard. Therefore, the less angle deviation amount in the next-generation standard, the more effective to avoid a decrease in the focus error signal as compared to the angle deviation amount in the DVD standard or the CD standard.

According to setting the position of the objective lens, the angle deviation amount between the tracks of the optical disc 5 of the next-generation standard and the division line of the photodetector is smaller than that between the tracks of the optical discs 5 of the DVD standard and the CD standard and the division line of the photodetector.

Figure 9:
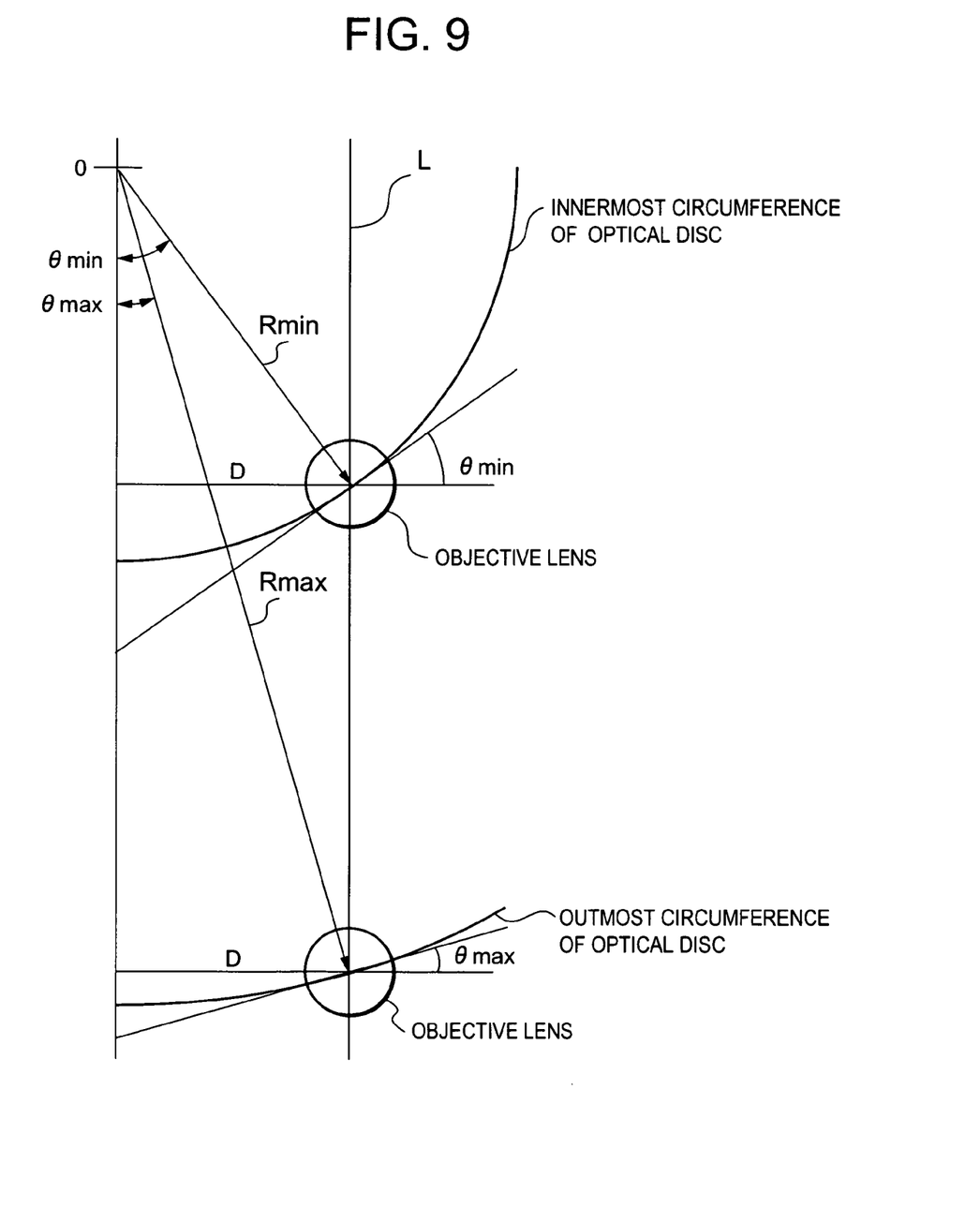
FIG. 9 is a view showing the position relation between the centers of the objective lenses and the center of the optical disc in the optical head unit of FIG. 2.

FIG. 9 shows the position relation between the centers of the objective lenses and the center O of the optical disc 5.

As shown in FIG. 9, the distance between straight line L including the tracks of the centers of the objective lenses when the optical head unit 1 is moved between the innermost circumference and the outermost circumference of the optical disc 5 and the center of the optical disc 5 is D, and the radiuses of the innermost circumference and the outermost circumference of the optical disc 5 are $R_{min}$ and $R_{max}$, respectively. The angle deviation amounts between the tracks of the innermost circumference and the outermost circumference of the optical disc 5 and the division line of the photodetector 15*a* (see FIG. 6) are $\theta_{min}$ and $\theta_{max}$, respectively, by the following equations.

$$\sin \theta_{min} = D/R_{min}, \sin \theta_{max} = D/R_{max}$$

Figure 6B:
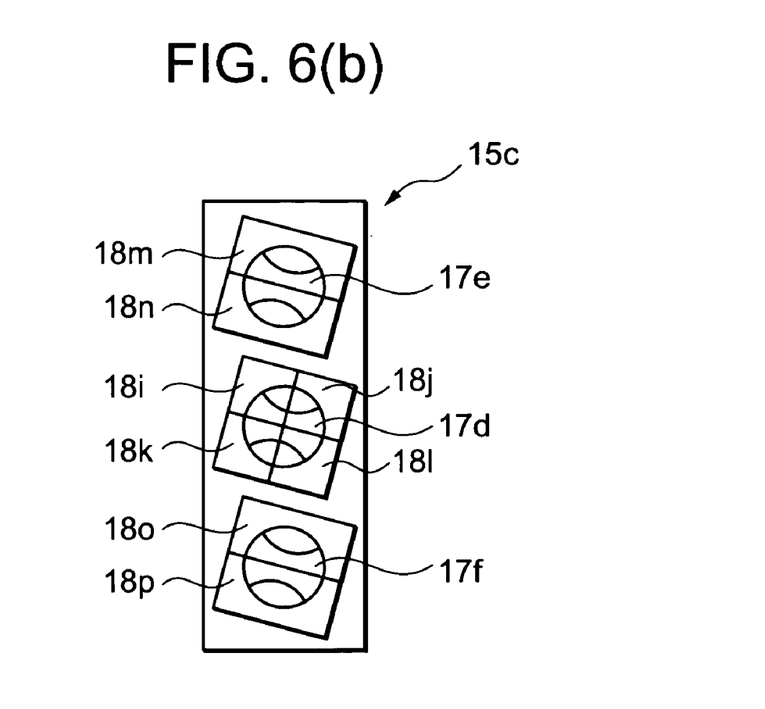

The division line of the photodetector 15*a* may be tilted with respect to the direction orthogonal to the tracks of the centers of the objective lenses (that is, the straight line L) by $(\theta i_{min}+\theta_{max})/2$ as a photodetector 15*c* shown in FIG. 6(*b*). Accordingly, both of the angle deviation amounts between the tracks of the innermost circumference and the outermost circumference of the optical disc 5 and the division line of the photodetector 15*c* can be reduced to $(\theta_{max}-\theta_{min})/2$.

The light spots 17*d*, 17*e* and 17*f* of FIG. 6(*b*) correspond to the light spots 17*a*, 17*b* and 17*c* of FIG. 6(*a*), respectively. The light reception parts 18*i* to 18*p* of FIG. 6(*b*) correspond to the light reception parts 18*a* to 18*h* of FIG. 6(*a*), respectively. The construction shown in FIG. 6(*b*) is the same as the construction shown in FIG. 6(*a*) except that the two division lines in parallel with the radius direction and the tangent direction of the optical disc 5 are tilted with respect to the direction orthogonal to the tracks of the centers of the objective lenses (that is, the straight line L) by $(\theta_{min}+\theta_{max})/2$.

In the same manner, the photodetector 15*b* may be replaced by the construction shown in FIG. 6(*b*).

In a case that the straight line L including the tracks of the centers of the objective lenses 3*a*, 3*b* when the optical head unit 1 is moved between the innermost circumference and the outermost circumference of the optical disc 5 does not pass through the center of the optical disc 5, the angle between the track of the optical disc 5 and the focal spot row on the optical disc 5 is changed according to the radius of the optical disc 5 where the centers of the objective lens 3*a*, 3*b* are positioned. Therefore, the phase between the push-pull signal of the new order light and that of the ±1 order diffraction lights may be compensated according to the angle between the track of the optical disc 5 and the focal point row on the optical disc 5 to avoid a change of an amplitude of the track error signal by the "difference push-pull method". Instead, a diffraction optical device formed with the grating pattern shown in FIG. 10 may be used as the diffraction optical device 8*a*.

Figure 10:
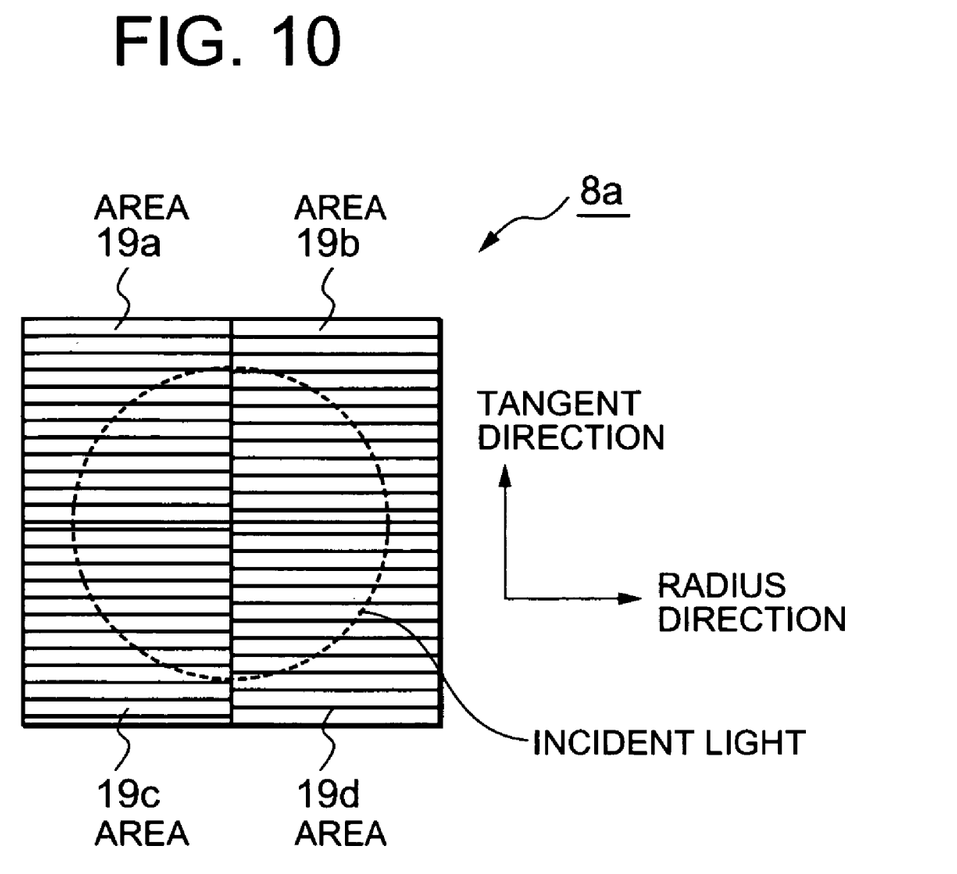
FIG. 10 is an explanatory view showing the construction of a diffraction optical device used in the optical head unit of FIG. 2.

The diffraction grating pattern of FIG. 10 is divided into four areas 19*a*, 19*b*, 19*c* and 19*d* by a straight line in parallel with the radius direction of the optical disc 5 and a straight line in parallel with the tangent direction of the optical disc 5 passing through the optical axis of an incident light. The phases of the gratings in the areas 19*a*, 19*d* and the phases of the gratings in the areas 19*b*, 19*c* are shifted from each other by $\pi/2$. In other words, the phase of the grating in the area 19*a* is shifted from the phase of the grating in the area 19*b* by $\pi/2$ and is also shifted from the phase of the grating in the area 19*c* by $\pi/2$. The phase of the grating in the area 19*d* is shifted from the phase of the grating in the area 19*b* by $\pi/2$ and is also shifted from the phase of the grating in the area 19*c* by $\pi/2$.

According to the diffraction grating pattern as shown in FIG. 10, the amplitude of the push-pull signals of the ± first order diffraction lights from the diffraction optical device 8*a* as the sub beam is always 0. Therefore, the amplitude of the track error signal of the "difference push-pull method" is not changed as described in Japanese Journal of Applied Physics, Vol. 38, pp. 1761–1767.

Similar to this, as the diffraction optical devices 8*b*, 8*c* of the second optical system 2*b*, the diffraction optical device formed with the grating pattern shown in FIG. 10 may be used.

As described above, the optical head unit 1 of the first embodiment of the present invention is provided with the first objective lens 3*a*, the first optical system 2*a*, the second objective lens 3*b*, and the second optical system 2*b*. When the protective layer of the optical disc 5 has a first thickness corresponding to the next-generation standard, the semiconductor laser (first light source) 7*a* of the first optical system 2*a* and the first objective lens 3*a* are used. When the protective layer of the optical disc 5 has a second thickness corresponding to the DVD standard, the semiconductor laser (second light source) 7*b* of the second optical system 2*b* and the second objective lens 3*b* are used. When the protective layer of the optical disc 5 has a third thickness corresponding to the CD standard, the semiconductor laser (third light source) 7*c* of the second optical system 2*b* and the second objective lens 3*b* are used. Further, the wavelength of the emitted light of the semiconductor laser 7*a* corresponds to the next-generation standard. The wavelength of the emitted light of the semiconductor laser 7*b* may correspond to the DVD standard, the wavelength of the emitted light of the semiconductor laser 7*c* may correspond to the CD standard. Therefore, information can be written or read onto/from any of the optical discs. Information can be written or read, not only onto/from conventional optical recording media of the DVD standard and the CD standard, but also onto/from an optical recording medium of the next-generation standard using a blue light.

Figure 11:
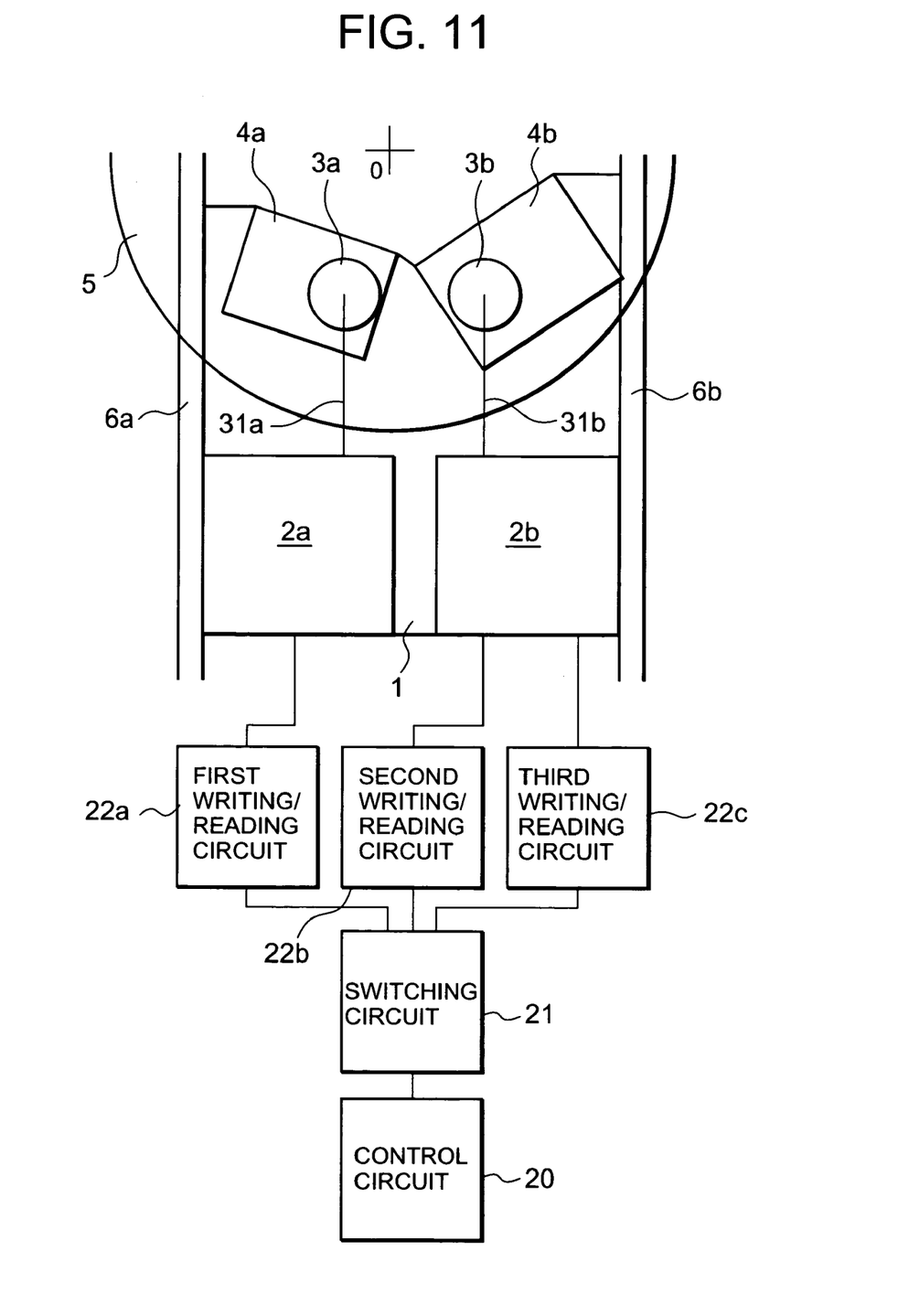
FIG. 11 is a plan view showing the schematic construction of an optical information writing/reading device of a second embodiment of the present invention.

FIG. 11 shows the schematic construction of an optical information writing/reading device of a second embodiment of the present invention.

The optical information writing/reading device is constructed by adding a first writing/reading circuit 22*a*, a second writing/reading circuit 22*b*, a third writing/reading circuit 22*c*, a switching circuit 21, and a control circuit 20, to the optical head unit 1 of the above-described first embodiment.

The first writing/reading circuit 22*a* generates an input signal to the semiconductor laser 7*a* provided in the first optical system 2*a* based on a write signal to the optical disc 5 of the next-generation standard. It generates a read signal from the optical disc 5 based on an output signal from the photodetector 15*a* provided in the first optical system 2*a*.

The second writing/reading circuit 22*b* generates an input signal to the semiconductor laser 7*b* provided in the second optical system 2*b* based on a write signal to the optical disc 5 of the DVD standard. It generates a read signal from the optical disc 5 based on an output signal from the photodetector 15*b* provided in the second optical system 2*b*.

The third writing/reading circuit 22*c* generates an input signal to the semiconductor laser 7*c* provided in the second optical system 2*b* based on a write signal to the optical disc 5 of the CD standard. It generates a read signal from the optical disc 5 based on an output signal from the photodetector 15*b* provided in the second optical system 2*b*.

The switching circuit 21 switches a transmission path of the input signal from the first writing/reading circuit 22*a* to the semiconductor laser 7*a* of the first optical system 2*a*, a transmission path of the input signal from the second writing/reading circuit 22*b* to the semiconductor laser 7*b* of the second optical system 2*b*, and a transmission path of the input signal from the third writing/reading circuit 22c to the semiconductor laser 7c of the second optical system 2b. In addition, it switches a transmission path of the output signal from the photodetector 15a of the first optical system 2a to the first writing/reading circuit 22a, a transmission path of the output signal from the photodetector 15b of the second optical system 2b to the second writing/reading circuit 22b, and a transmission path of the output signal from the photodetector 15b of the second optical system 2b to the third writing/reading circuit 22c.

The control circuit 20 controls the operation of the switching circuit 21 as follows. When the optical disc 5 of the next-generation standard is inserted into the optical information writing/reading device, it is detected to transmit an input signal from the first writing/reading circuit 22a to the semiconductor laser 7a and an output signal from the photodetector 15a to the first writing/reading circuit 22a. When the optical disc 5 of the DVD standard is inserted thereinto, an input signal is transmitted from the second writing/reading circuit 22b to the semiconductor laser 7b and an output signal is transmitted from the photodetector 15b to the second writing/reading circuit 22b. When the optical disc 5 of the CD standard is inserted thereinto, an input signal is transmitted from the third writing/reading circuit 22c to the semiconductor laser 7c and an output signal is transmitted from the photodetector 15b to the third writing/reading circuit 22c.

As described above, the optical information writing/reading device of the second embodiment of the present invention includes the above-described optical head unit 1 of the first embodiment of the present invention and switches and uses the optical systems and the writing/reading circuits depended upon the kind of the optical disc 5 inserted. Therefore, information can be written or read onto/from the optical disc 5 corresponding to any kinds of optical discs.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. An optical head unit comprising:
 a first light source emitting a light with a first wavelength;
 a second light source emitting a light with a second wavelength;
 a third light source emitting a light with a third wavelength;
 a first objective lens irradiating said light emitted from said first light source onto an optical recording medium, and said first objective lens being fixed in a path of said light emitted from said first light source;
 a second objective lens irradiating said light emitted from said second light source or said light emitted from said third light source onto an optical recording medium, and said second objective lens being fixed in a path of said light emitted from said second light source and said light emitted from said third light source; and
 a photodetector receiving a reflected light from said optical recording medium.

2. The optical head unit according to claim 1,
 wherein said first wavelength is shorter than said second wavelength, and said second wavelength is shorter than said third wavelength.

3. The optical head unit according to claim 1,
 wherein said first objective lens is designed to have a spherical aberration canceling a spherical aberration caused when said light with said first wavelength passes through said optical recording medium having a first thickness of protective layer, and
 wherein said second objective lens is designed to have a spherical aberration canceling a spherical aberration caused when said light with said second wavelength passes through said optical recording medium having a second thickness of protective layer and to have a spherical aberration canceling a spherical aberration caused when said light with said third wavelength passes through said optical recording medium having a third thickness of protective layer.

4. The optical head unit according to claim 3,
 wherein said first thickness of the protective layer of said optical recording medium is smaller than said second thickness, and said second thickness is smaller than said third thickness.

5. The optical head unit according to claim 2,
 wherein when said optical head unit is moved between an innermost circumference and an outermost circumference of said optical recording medium, a distance between a straight line including a track of a center of said first objective lens and a center of said optical recording medium is set to be shorter than a distance between a straight line including a track of a center of said second objective lens and said center of said optical recording medium.

6. The optical head unit according to claim 1,
 wherein said photodetector includes a plurality of light reception parts.

7. The optical head unit according to claim 6,
 wherein at least of said light reception parts is divided by a division line in parallel with a tangent direction of said optical recording medium.

8. The optical head unit according to claim 6,
 wherein at least of said light reception parts is divided by a division line in parallel with a radius direction of said optical recording medium.

9. The optical head unit according to claim 7,
 wherein when an angle deviation amount between tracks in an innermost circumference and an outermost circumference of said optical recording medium and said division line in parallel with said tangent direction of said optical recording medium are θmin and θmax, respectively, said division line in parallel with said tangent direction of said optical recording medium is tilted by (θmin+θmax)/2 with respect to a direction orthogonal to a track of said centers of said objective lenses.

10. The optical head unit according to claim 1, further comprising a diffraction optical device dividing at least one of said lights from said first light source, said second light source and said third light source into a zero order light, a+1 order diffraction light and a−1 order diffraction light.

11. The optical head unit according to claim 10,
wherein a grating pattern formed in said diffraction optical device is divided into a first area, a second area, a third area and a fourth area by a straight line in parallel with a radius direction of said optical recording medium and a straight line in parallel with a tangent direction thereof passing through an optical axis of its incident light, and wherein phases of said gratings of said first area and said fourth area and phases of said gratings of said second area and said third area are shifted from each other by $\pi/2$.

12. The optical head unit according to claim 1,
wherein said first wavelength is about 405 nm, second wavelength is about 650 nm, and said third wavelength is about 780 nm.

13. An optical information writing/reading device comprising said optical head unit according to claim 1.

14. The optical information writing/reading device according to claim 13, further comprising:
- a writing/reading circuit generating an input signal to at least one of said first light source, said second light source and said third light source and generating a read signal based on said reflected light from said optical recording medium;
- a switching circuit switching transmission paths for supplying said input signal to said first light source, said second light source and said third light source; and
- a control circuit controlling said switching circuit.

15. The optical information writing/reading device according to claim 14,
wherein said control circuit controls said switching circuit depending on a thickness of a protective layer of said optical recording medium.

16. The optical information writing/reading device according to claim 13, further comprising:
- a first writing/reading circuit generating an input signal to said first light source and generating a read signal based on said reflected light from said optical recording medium;
- a second writing/reading circuit generating an input signal to said second light source and generating a read signal based on said reflected light from said optical recording medium;
- a third writing/reading circuit generating an input signal to said third light source and generating a read signal based on said reflected light from said optical recording medium;
- a switching circuit switching said first writing/reading circuit, said second writing/reading circuit, and said third writing/reading circuit; and
- a control circuit controlling said switching circuit depending on a thickness of a protective layer of said optical recording medium.

* * * * *